(12) United States Patent
Khudyakov et al.

(10) Patent No.: US 6,171,698 B1
(45) Date of Patent: Jan. 9, 2001

(54) RADIATION CURABLE COATING COMPOSITION FOR OPTICAL FIBERS AND OPTICAL FIBERS COATED THEREBY

(75) Inventors: Igor V. Khudyakov, Hickory; Bob J. Overton, Lenoir; Michael Purvis, Hickory, all of NC (US)

(73) Assignee: Alcatel, Paris (FR)

( * ) Notice: Under 35 U.S.C. 154(b), the term of this patent shall be extended for 0 days.

(21) Appl. No.: 09/377,095

(22) Filed: Aug. 19, 1999

(51) Int. Cl.[7] .............................. G02B 6/02; C05L 83/02; C08F 2/50
(52) U.S. Cl. ........................... 428/378; 385/123; 522/84; 522/80; 522/99; 522/148; 524/858; 524/859; 528/26; 528/32; 528/38
(58) Field of Search ..................... 522/172, 173, 522/182, 80, 99, 84, 85, 148; 528/26, 32, 38; 385/123; 428/378; 524/858, 869, 300, 795, 859

(56) References Cited

U.S. PATENT DOCUMENTS

| 4,554,339 | 11/1985 | Hockemeyer et al. . |
| 4,571,349 | 2/1986 | Hockemeyer et al. . |
| 4,597,987 | 7/1986 | Hockemeyer et al. . |
| 4,755,577 | 7/1988 | Suzuki . |
| 4,835,057 | 5/1989 | Bagley et al. . |
| 4,889,901 | * 12/1989 | Shama et al. . |
| 4,921,880 | 5/1990 | Lee et al. . |
| 4,972,005 | * 11/1990 | Aoki et al. . |
| 5,336,563 | 8/1994 | Coady et al. . |
| 5,536,529 | 7/1996 | Shustack . |
| 5,595,820 | 1/1997 | Szum . |
| 5,664,041 | 9/1997 | Szum . |
| 5,695,851 | * 12/1997 | Watanabe et al. . |
| 5,837,750 | 11/1998 | Szum et al. . |
| 5,977,202 | * 11/1999 | Chawla et al. . |

* cited by examiner

*Primary Examiner*—Susan W. Berman
(74) *Attorney, Agent, or Firm*—Ware, Fressola, Van Der Sluys & Adolphson LLP

(57) ABSTRACT

A radiation curable coating composition for forming a primary polymeric coating on having good adhesion to a glass optical fiber is disclosed. The coating composition is formed by a mixture of a base radiation curable liquid composition capable of forming a polymeric coating; and a hydrolyzed coupling agent mixture comprising N-beta (aminoethyl)-gamma-aminopropylmethyldimethoxysilane, N-beta (aminoethyl)-gamma-aminopropyltrimethoxysilane, isocyanatopropyltriethoxysilane, and gamma-(trimethoxylsilyl)propylacrylate.

21 Claims, 1 Drawing Sheet

RADIATION CURABLE COATING COMPOSITION FOR OPTICAL FIBERS AND OPTICAL FIBERS COATED THEREBY

BACKGROUND OF THE INVENTION

1. Field of the Invention

The present invention relates to protective coating compositions for glass optical fibers and glass optical fibers having coatings formed from such coating compositions. More particularly, the present invention relates to radiation curable, primary protective liquid coating composition for glass optical fibers formulated to have good adhesion and strength properties and glass optical fibers coated thereby.

2. Description of the Related Art

For many years now, optical fibers made from drawn glass have been used as a reliable transmission medium in telecommunications cables. Glass optical fibers are widely used because they have the ability to carry large amounts of information over long distances. Glass fibers are inherently strong because the glass forming the fiber has an intrinsic strength on order of $3 \times 10^9$ N/m$^2$. See, "Optical Fibers for Transmission", J. E. Midwinter, 1979, John Wiley and sons. The retention of such strength is largely dependent upon the application environment surrounding the optical fiber. For example, if the optical fiber is subjected to an abrasive environment, the abrasion, even with micron sized particles, produces microscopic flaws in the glass surface. These flaws propagate through the glass and eventually cause a fracture of the glass fiber. Glass optical fibers can also lose strength from contact with moisture and ions in solution. It is well known that hydrolysis of the surface bonds in silica glass occurs rapidly in the presence of water containing sodium ions. The hydrolysis of the surface bonds causes significant strength deterioration.

To protect the integrity and strength of glass optical fibers from environmentally caused degradation, one or more protective polymeric coatings have been applied to the outer surface, such as the cladding, of such optical fibers, shortly after the optical fibers have been drawn from a glass preform. One purpose of the coatings is to protect the surface of the optical fiber from mechanical scratches and abrasions typically caused by subsequent handling and use. Another purpose of the coatings is to protect the glass from exposure to moisture and ions in solution. The coating or coatings may also have some influence over the fiber's optical characteristics because the coatings are physically responsive to external mechanical forces and temperature.

The coating compositions applied to the optical fiber are typically liquid, radiation curable compositions. Typically, the coating compositions are cured on the optical fiber by exposing the coating composition to ultraviolet radiation, electron beam radiation or ionizing radiation for a predetermined period of time deemed suitable for effective curing.

It is important that the cured coating adhere well to the glass cladding, otherwise the cured coating will have a tendency to delaminate from the optical fiber. Delamination of the coating from the optical fiber is undesirable because the protective function of the coating is lost. Those skilled in the art will appreciate that adherence properties of a coating are typically determined by measuring the force required to peel a coating from a test surface, such as a glass plate, to which it has been applied.

SUMMARY OF THE INVENTION

It is an object of the present invention to provide a relatively inexpensive radiation curable liquid coating composition for application to a glass optical fiber which has good adhesive properties to the glass of the optical fiber and good mechanical properties.

It is another object of the present invention to provide a glass optical fiber having a radiation cured primary coating covering a least a portion of its surface, the primary coating having good adhesive properties to the surface of the glass optical fiber in which it covers and having suitable mechanical properties for protecting the optical fiber.

These objects are accomplished, at least in part, by providing a radiation curable liquid coating composition for forming a primary coating on a glass optical fiber, the composition comprising: a base radiation curable liquid composition capable of forming a polymeric coating, and a hydrolyzed coupling agent mixture of N-beta(aminoethyl)-gamma-aminopropylmethyldimethoxysilane, N-beta (aminoethyl)-gamma-aminopropyltrimethoxysilane, isocyanatopropyltriethoxysilane, and gamma-(trimethoxylsilyl)propylacrylate.

These objects are also accomplished, at least in part, by providing a glass optical fiber having at least a portion of its surface coated with a radiation cured coating formed by applying a radiation curable coating composition comprising a base radiation curable liquid composition capable of forming a polymeric coating, and a hydrolyzed coupling agent mixture, and exposing the radiation curable coating composition to radiation of a suitable wavelength, intensity and period to cause the coating composition to cure. The hydrolyzed coupling agent mixture is formed by a mixing N-beta(aminoethyl)-gamma-aminopropylmethyldimethoxysilane, N-beta(aminoethyl)-gamma-aminopropyltrimethoxysilane, isocyanatopropyltriethoxysilane, and gamma-(trimethoxylsilyl)propylacrylate and subjecting the coupling agent mixture to a hydrolyzation treatment process prior to its addition to the base radiation curable liquid composition.

Other objects and advantages will become apparent to those skilled in the art upon reading the detailed description in view of the drawing set forth below.

DETAILED DESCRIPTION OF THE PRESENT INVENTION

Figure 1:
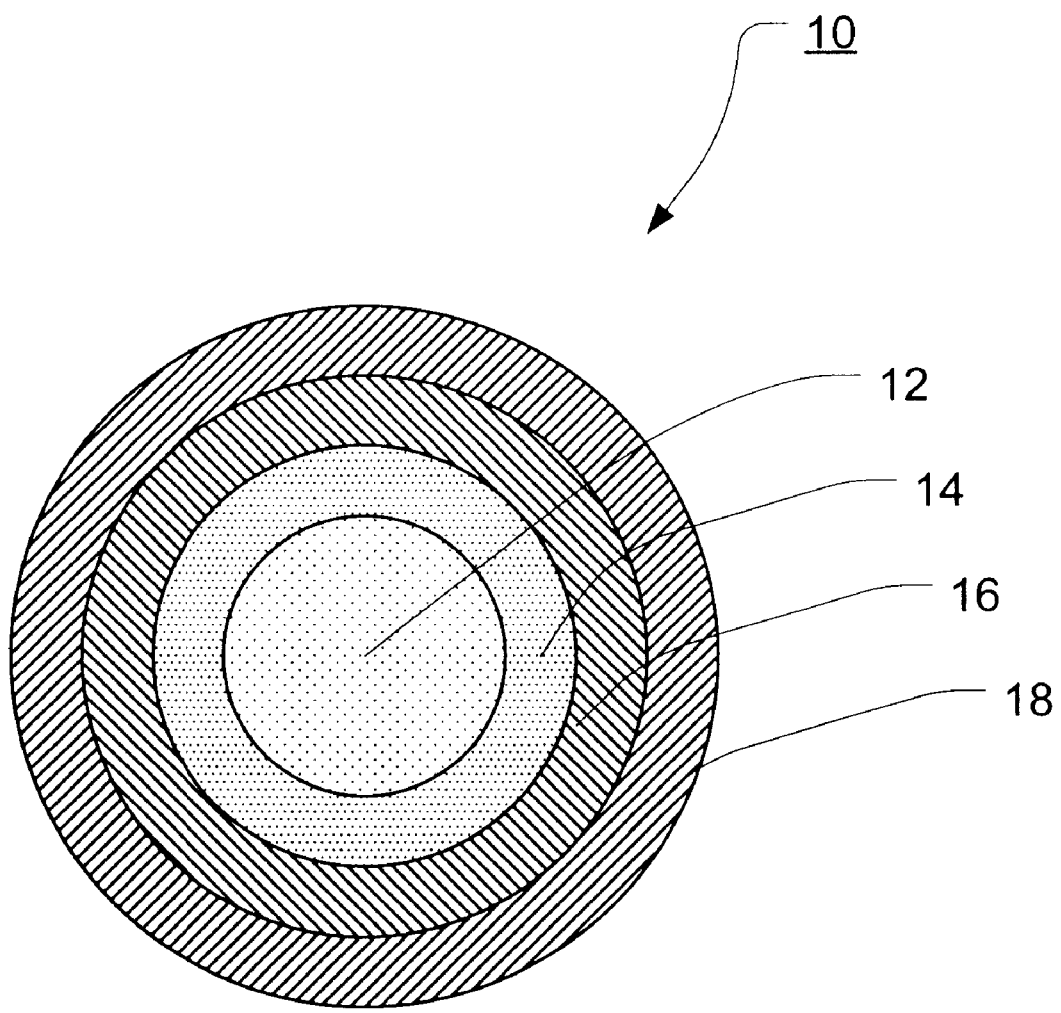
FIG. 1, which is a cross-sectional schematic diagram of an optical fiber having a two protective coatings thereon.

Typical telecommunications elements include an elongated transmission medium such as a metallic wire or an optical fiber. Referring to FIG. 1, a typical optical fiber 10 transmission medium is shown. The typical optical fiber 10 is formed by a glass core 12 which is surrounded by a glass cladding 14. The glass cladding 14 of the optical fiber 10 is usually surrounded by one or more protective polymeric coatings. For example, as shown in FIG. 1, an inner protective polymeric coating 16 is applied over the cladding 14 and an outer protective polymeric coating 18 is applied over the inner coating 16. The inner 16 and outer 18 protective coatings may also be referred to as inner primary and outer primary coatings or primary and secondary coatings. The inner coating 16 is usually obtained by applying a radiation curable (polymerizable) liquid composition over the cladding 14. Such liquid compositions typically contain radiation curable oligomeric components having ethylenically unsaturated functional groups, such as acrylate or methacrylate groups. Other components that may be included in the base radiation curable liquid composition which is suitable for forming a polymeric coating over the glass optical fiber include reactive diluents, photo-initiators and flow promoters or controllers. The liquid composition is normally applied by passing the optical fiber through a first die or a coating applicator using techniques well known in the art, and therefore, not described herein. Once the liquid composition is applied over the cladding 14, the liquid composition may be cured by exposing it to radiation, such as ultraviolet radiation, electron beam radiation or ionizing radiation, to initiate curing (polymerization) thereof. Ultraviolet radiation is most commonly used. The application and curing of the liquid composition to form the inner coating 16 is typically followed by the application and curing of a radiation curable liquid composition having suitable components for forming the outer or secondary coating 18. This sequence is known as a wet-on-dry application of the outer coating 18. Alternatively, the application of the liquid composition which forms the inner coating 16 may be directly followed by the application of an liquid composition forming the outer coating 18 prior to exposure to the curing radiation. This is known in the art as a wet-on-wet application. Each application technique is well known in the art.

The following examples of primary or inner coating compositions are intended to illustrate the present invention and are not intended to limit the claims or any other part of the specification in any way.

EXAMPLE 1

A base radiation curable liquid composition suitable for forming a primary polymeric coating on a glass optical fiber was prepared, in part, by combining and mixing: 11.99 weight percent ODA-N from UCB Chemicals, a mixture of monofunctional monomers consisting of linear eight and ten carbon acrylate esters, 59 weight percent Ebecry™ 230 from UCB Chemicals, which is a relatively high molecular weight (about 5000) aliphatic urethane diacrylate, 23 weight percent CN966J75, which is a urethane acrylate-isobornyl acrylate oligomer mixture produced by Sartomer, 1.5 weight percent 2-ethylhexyl acrylate, 4.5 weight percent Darocur™ 4265, which is a photoinitiator produced by Ciba, and 0.01 weight percent FC 740, which is a fluoroaliphatic polymer ester containing heavy aromatic solvents such as naptha and napthalene produced by the 3M Company.

Three films of the base liquid composition were prepared. Each film was prepared by drawing down the liquid composition on a 20 by 20 cm polished glass plate with a 0.005 Byrd. The drawn films on the glass plates were cured by passing the glass plates through a Fusion conveyor system with a Fusion D bulb having an applied dose of 1.0 J/cm$^2$ in an inert atmosphere. The cured films were conditioned in a no light environment kept at room temperature and 50 percent relative humidity for seven days prior to testing. After the conditioning phase, three test specimens were cut from each glass plate. Each test specimens was obtained by placing a 1.25 inch (3.18 cm) wide ruler on the film on a section of the cured film that appeared to be uniform and free of defects. To minimize the effects of minor sample defects, each sample specimen was cut parallel to the direction in which the draw down of the cured film was prepared. A six inch (15.24 cm) cut on both sides of the ruler was made with a razor blade by holding the blade firmly against the sides of the ruler and cutting completely through the film to the glass plate. The edges of the specimens were inspected for tearing or nicks. Strips that showed such damage were rejected. A 1.25 inch (3.18 cm) wide piece of tape was applied to the length of the strip to prevent the film from tearing when the film starts to peel during adhesion testing.

Adhesion testing was performed with a calibrated Instron Model 4201 universal testing instrument. The crosshead speed was set to 10.00 inches per minute (254 mm per minute). A binder clip was attached to a length of steel wire, which was run through the pulley on a coefficient of friction (COF) test apparatus. The free end of the steel wire was clamped in the upper jaw of the Instron testing instrument. The end of each test strip was peeled back about 1 inch (2.54 cm). The glass plate was placed on the COF support table with the peeled-back end of the specimen facing away from the pulley. The binder clip was attached to the peeled-back end of the specimen. The Instron test instrument was initiated to pull on the binder clip. Peel force data was collected by computer software. The average peel force for the nine test strips of the cured base liquid composition was about 0.16N+/−0.03N. The base coating had an elongation to break of about 80 percent, a modulus on the order of about 1.2 and a glass transition temperature ($T_g$) of about −10° C.

EXAMPLE 2

A radiation curable coating composition for providing a primary coating on a glass optical fiber was made by first subjecting N-beta(aminoethyl)-gamma-aminopropylmethyldimethoxysilane, coupling agent sold by ShinEtsu under the product designation KBM 602 to a hydrolyzation process. N-beta(aminoethyl)-gamma-aminopropylmethyldimethoxysilane has the following formula:

The hydrolyzation process was carried out simply by placing the coupling agent in a flask and stirring the coupling agent with a magnetic stirrer for about 48 hours. Periodically, the flask would be opened to relatively warm, moist air (room temperature, 60 to 80 percent relative humidity). The contents of the flask were agitated to ensure good mixing of the warm, moist air with the coupling agent. (Alternatively or additionally, about 0.25 grams of dilute acetic acid (pH of about 5) could be added to about 80 grams of the coupling agent to promote hydrolysis.) At the end of the hydrolyzation process, the hydrolyzed coupling agent was added to the base radiation curable liquid composition of Example 1 at the rate of 6 grams per 40 grams of the base liquid composition to yield a coating composition containing 1.5 weight percent of the hydrolyzed N-Beta (aminoethyl)-gamma-aminopropyltrimethoxysilane. This coating composition was drawn down and tested in the same manner as described above for Example 1. The average peel force for the nine test strips produced from this coating composition was about 0.8N. The resulting coating had an elongation to break of about 80 percent, a modulus on the order of about 1.2 and a $T_g$ of about −10° C., which is the same as the coating formed from the base liquid composition. This hydrolyzed coupling agent provided a coating with marginally better adhesion than the adhesion of the coating resulting from the base liquid composition described in Example 1.

EXAMPLE 3

Another coating composition was made by adding 6 grams of N-beta(aminoethyl)-gammaaminopropyltrimethoxysilane, a coupling agent sold by ShinEtsu under the product designation KBM-603, subjected to the hydrolyzation process described in Example 2, per every 40 grams of the base liquid composition of Example 1 to yield a coating composition containing 1.5 weight percent of hydrolyzed N-beta(aminoethyl)-gamma-aminopropyltrimethoxysilane coupling agent. N-beta (aminoethyl)-gamma-aminopropyltrimethoxysilane has the following formula:

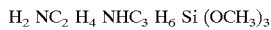

$H_2NC_2H_4NHC_3H_6Si(OCH_3)_3$

This composition was drawn down and tested in the same manner as described above for Example 1. The average peel force for the nine test strips produced from this coating composition was about 0.49N. The resulting coating had an elongation to break of about 80 percent, a modulus on the order of about 1.2 and a $T_g$ of about −10° C. This hydrolyzed coupling agent provided a coating with adhesion better than the adhesion of the hydrolyzed coupling agent of Example 2, and better than the base liquid composition described in Example 1. The physical properties of this coating were about the same as the physical properties of the base coating described in Example 1.

EXAMPLE 4

6 grams of gamma-(trimethoxysilyl)propylacrylate coupling agent sold by ShinEtsu under the product designation KBM-5103, also subjected to the hydrolyzation process described in Example 2, was added per every 40 grams of the base coating composition of Example 1 to yield a coating composition containing 1.5 weight percent of the hydrolyzed gamma-(trimethoxysilyl)propylacrylate coupling agent. gamma-(trimethoxysilyl)propylacrylate has the following formula:

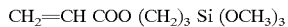

$CH_2=CH\ COO\ (CH_2)_3\ Si\ (OCH_3)_3$

This primary coating composition was drawn down and tested in the same manner as described above for Example 1. The average peel force for the nine test strips produced from this composition was about 0.16N. The resulting coating had an elongation to break of about 80 percent, a modulus on the order of about 1.2 and a $T_g$ of about −10° C. The hydrolyzed gamma-(trimethoxysilyl)propylacrylate coupling agent provided a coating with about the same adhesion as the adhesion of the base coating composition described in Example 1. The physical properties of this coating were about the same as the physical properties of the base coating described in Example 1.

EXAMPLE 5

6 grams of isocyanatopropyltriethoxysilane coupling agent sold by United Chemical Technologies under the product designation UCT 7840KG was added, after undergoing the hydrolyzation process described in Example 2, per every 40 grams of the base liquid composition of Example 1 to yield a coating composition containing 1.5 weight percent of the hydrolyzed isocyanatopropyltriethoxysilane coupling agent. Isocyanatopropyltriethoxysilane has the following formula:

$OCNCH_2\ CH_2\ CH_2\ Si\ (OC_2H_5)_3$

This composition was drawn down and tested in the same manner as described above for Example 1. The average peel force for the nine test strips produced from this composition was about 3.44N. The resulting had an elongation to break of about 80 percent, a modulus on the order of about 1.2 and a $T_g$ of about −10° C., which is the same as the coating formed from the base composition and the coatings in the other examples described above. The hydrolyzed isocyanatopropyltriethoxysilane coupling agent provided a coating with significantly better adhesion than the adhesion of the other coatings examples and the coating resulting from the base liquid composition described in Example 1.

EXAMPLE 6

A coupling agent mixture, formed by equal weight amounts of N-beta(aminoethyl)-gamma-aminopropylmethyldimethoxysilane (KBM-602), N-beta (aminoethyl)-gamma-aminopropyltrimethoxysilane (KBM-603), isocyanatopropyltriethoxysilane (UCT 7840KG) and gamma-(trimethoxysilyl)propylacrylate (KBM-5103) was stirred in a flask with a magnetic stirrer for about 48 hours. Periodically, about every 5 hours, the flask was opened to warm, moist air (room temperature, relative humidity of about 60 to 80 percent) and agitated in order to get the warm moist air well blended with the coupling agent mixture. Dilute acetic acid (pH of about 5) was added to the coupling agent mixture at a rate of about 0.25 grams per every 80 grams of the coupling agent mixture to further promote hydrolysis. At the end of the 48 hour hydrolyzation process, the hydrolyzed coupling agent mixture was added to the base liquid composition of Example 1 at the rate of 6 grams added per every 40 grams of the base liquid composition. The resulting coating composition contained about 1.5 weight percent hydrolyzed coupling agent mixture. This coating composition was drawn down and tested in the same manner as described above for Example 1. The average peel force for the nine test strips produced from this composition was about 4.59N+/−0.55N. The resulting coating had an elongation to break of about 80 percent, a modulus on the order of about 1.2 and a $T_g$ of about −10° C., which is the same as the coating formed from the base composition. This hydrolyzed coupling agent provided a coating with significantly better adhesion than the adhesion of all of the coatings as described in the above examples.

In summary, the present invention provides a relatively inexpensive radiation curable liquid coating composition for application to a glass optical fiber which has good adhesive properties to the glass of the optical fiber and good mechanical properties. This invention has been described in terms of specific embodiments set forth in detail, but it should be understood that these are by way of illustration only. It should be appreciated by those skilled in the art that departures can be made from the following claims without parting from the spirit and scope of the invention. Accordingly, such variations and modifications of the disclosed subject matter are considered to be within the purview and scope of the invention and the following claims.

What is claimed is:

1. A radiation curable coating composition for forming a primary polymeric coating on a glass optical fiber, the composition comprising a mixture of:
   a base radiation curable liquid composition capable of forming a polymeric coating; and
   a hydrolyzed coupling agent mixture comprising N-beta (aminoethyl)-gamma-aminopropylmethyldimethoxysilane, N-beta (aminoethyl)-gamma-aminopropyltrimethoxysilane, isocyanatopropyltriethoxysilane, and gamma-(trimethoxylsilyl)propylacrylate.

2. The coating composition of claim 1, wherein the base radiation curable liquid composition includes an aliphatic urethane diacrylate oligomer.

3. The coating composition of claim 1, wherein the base radiation curable liquid composition includes an isobornyl acrylate oligomer.

4. The coating composition of claim 1, wherein the base radiation curable liquid composition includes a mixture of monofunctional monomers consisting of linear eight and ten carbon acrylate esters.

5. The coating composition of claim 1, wherein the base radiation curable liquid composition includes 2-ethylhexyl acrylate.

6. The coating composition of claim 1, wherein the base radiation curable liquid composition includes a photoinitator.

7. The coating composition of claim 1, wherein the base radiation curable liquid composition includes a fluoroaliphatic polymer ester containing heavy aromatic solvents selected from the group consisting of naptha and napthalene.

8. The coating composition of claim 1, wherein the base radiation curable liquid composition comprises an aliphatic urethane diacrylate oligomer, isobornyl acrylate oligomer, a mixture of monofunctional monomers consisting of linear eight and ten carbon acrylate esters, 2-ethylhexyl acrylate, a photoinitator, and a fluoroaliphatic polymer ester containing heavy aromatic solvents selected from the group consisting of naptha and napthalene.

9. The coating composition of claim 1, wherein the hydrolyzed coupling agent mixture comprises up to 1.5 weight percent of the coating composition.

10. The coating composition of claim 1, wherein the hydrolyzed coupling agent mixture comprises substantially equal weights of N-beta (aminoethyl)-gamma-aminopropylmethyldimethoxysilane, N-beta (aminoethyl)-gamma-aminopropyltrimethoxysilane, isocyanatopropyltriethoxysilane, and gamma-(trimethoxylsilyl)propylacrylate.

11. The coating composition of claim 1, wherein the base radiation curable liquid composition comprises an aliphatic urethane acrylate oligomer, an isobornyl acrylate oligomer, 2-ethylhexyl acrylate, a mixture of monofunctional monomers consisting of linear eight and ten carbon acrylate esters, a photoinitator, and a fluoroaliphatic polymer ester containing heavy aromatic solvents selected from the group consisting of naptha and napthalene, wherein the hydrolyzed coupling agent mixture comprises substantially equal weights of N-beta (aminoethyl)-gamma-aminopropylmethyldimethoxysilane, N-beta (aminoethyl)-gamma-aminopropyltrimethoxysilane, isocyanatopropyltriethoxysilane, and gamma-(trimethoxylsilyl)propylacrylate, and wherein the hydrolyzed coupling agent mixture comprises up to 1.5 weight percent of the coating composition.

12. A method for forming a polymeric coating on at least a portion of a glass optical fiber, the method comprising the steps of:
   providing a glass optical fiber;
   applying a radiation curable coating composition over at least a portion of the glass optical fiber, wherein the radiation curable coating composition comprises a mixture of:
      a base radiation curable liquid composition capable of forming a polymeric coating; and
      a hydrolyzed coupling agent mixture comprising N-beta (aminoethyl)-gamma-aminopropylmethyldimethoxysilane, N-beta (aminoethyl)-gamma-aminopropyltrimethoxysilane, isocyanatopropyltriethoxysilane, and gamma-(trimethoxylsilyl)propylacrylate;
   exposing the applied radiation curable coating composition to radiation of a suitable intensity, wavelength and duration to cause the applied coating composition to cure.

13. The method of claim 12, wherein the base radiation curable liquid composition comprises an aliphatic urethane diacrylate oligomer, isobornyl acrylate oligomer, a mixture of monofunctional monomers consisting of linear eight and ten carbon acrylate esters, 2-ethylhexyl acrylate, a photoinitator, and a fluoroaliphatic polymer ester containing heavy aromatic solvents selected from the group consisting of naptha and napthalene.

14. The method of claim 12, wherein the hydrolyzed coupling agent mixture comprises up to 1.5 weight percent of the coating composition.

15. The method of claim 12, wherein the hydrolyzed coupling agent mixture comprises substantially equal weights of N-beta (aminoethyl)-gamma-aminopropylmethyldimethoxysilane, N-beta (aminoethyl)-gamma-aminopropyltrimethoxysilane, isocyanatopropyltriethoxysilane, and gamma-(trimethoxylsilyl)propylacrylate.

16. The method of claim 12, wherein the base radiation curable liquid composition comprises an aliphatic urethane acrylate oligomer, an isobornyl acrylate oligomer, 2-ethylhexyl acrylate, a mixture of monofunctional monomers consisting of linear eight and ten carbon acrylate esters, a photoinitator, and a fluoroaliphatic polymer ester containing heavy aromatic solvents selected from the group consisting of naptha and napthalene, wherein the hydrolyzed coupling agent mixture comprises substantially equal weights of N-beta (aminoethyl)-gamma-aminopropylmethyldimethoxysilane, N-beta (aminoethyl)-gamma-aminopropyltrimethoxysilane, isocyanatopropyltriethoxysilane, and gamma-(trimethoxylsilyl)propylacrylate, and wherein the hydrolyzed coupling agent mixture comprises up to 1.5 weight percent of the coating composition.

17. An optical fiber comprising:
   a core;
   a cladding surrounding the core;
   a polymeric coating surrounding the cladding, wherein the polymeric coating is obtained by:
      applying a radiation curable coating composition over at least a portion of the glass optical fiber, wherein the radiation curable coating composition comprises a mixture of:
         a base radiation curable liquid composition capable of forming a polymeric coating; and
         a hydrolyzed coupling agent mixture comprising N-beta (aminoethyl)-gamma-aminopropylmethyldimethoxysilane, N-beta (aminoethyl)-gamma-aminopropyltrimethoxysilane, isocyanatopropyltriethoxysilane, and gamma-(trimethoxylsilyl)propylacrylate;
      exposing the applied radiation curable coating composition to radiation of a suitable intensity, wavelength and duration to cause the applied coating composition to cure.

18. The optical fiber of claim 17, wherein the base radiation curable liquid composition comprises an aliphatic urethane diacrylate oligomer, isobornyl acrylate oligomer, a mixture of monofunctional monomers consisting of linear eight and ten carbon acrylate esters, 2-ethylhexyl acrylate, a photoinitator, and a fluoroaliphatic polymer ester containing heavy aromatic solvents selected from the group consisting of naptha and napthalene.

19. The optical fiber of claim 17, wherein the hydrolyzed coupling agent mixture comprises up to 1.5 weight percent of the coating composition.

20. The optical fiber of claim 17, wherein the hydrolyzed coupling agent mixture comprises substantially equal weights of N-beta (aminoethyl)-gamma-aminopropylmethyldimethoxysilane, N-beta (aminoethyl)-gamma-aminopropyltrimethoxysilane, isocyanatopropyltriethoxysilane, and gamma-(trimethoxylsilyl)propylacrylate.

21. The optical fiber of claim 17, wherein the base radiation curable liquid composition comprises an aliphatic urethane acrylate oligomer, an isobornyl acrylate oligomer, 2-ethylhexyl acrylate, a mixture of monofunctional monomers consisting of linear eight and ten carbon acrylate esters, a photoinitator, and a fluoroaliphatic polymer ester containing heavy aromatic solvents selected from the group consisting of naptha and napthalene, wherein the hydrolyzed coupling agent mixture comprises substantially equal weights of N-beta (aminoethyl)-gamma-aminopropylmethyldimethoxysilane, N-beta (aminoethyl)-gamma-aminopropyltrimethoxysilane, isocyanatopropyltriethoxysilane, and gamma-(trimethoxylsilyl)propylacrylate, and wherein the hydrolyzed coupling agent mixture comprises up to 1.5 weight percent of the coating composition.

* * * * *